US012811765B2

(12) United States Patent
Hall et al.

(10) Patent No.: US 12,811,765 B2
(45) Date of Patent: Nov. 24, 2026

(54) DATA ALIGNMENT SYSTEM

(71) Applicant: NORTHROP GRUMMAN SYSTEMS CORPORATION, Falls Church, VA (US)

(72) Inventors: Jeffrey S. Hall, Annapolis, MD (US); Joseph A. Payne, Elgin, TX (US); Nathan Jerrold Bailie, Franklin, TN (US); Neigel G. Creese, Annapolis, MD (US)

(73) Assignee: Northrop Grumman Systems Corporation, Falls Church, VA (US)

(*) Notice: Subject to any disclaimer, the term of this patent is extended or adjusted under 35 U.S.C. 154(b) by 188 days.

(21) Appl. No.: 18/666,579

(22) Filed: May 16, 2024

(65) Prior Publication Data

US 2025/0358093 A1 Nov. 20, 2025

(51) Int. Cl.
*H04L 7/00* (2006.01)
*H04L 1/00* (2006.01)

(52) U.S. Cl.
CPC .......... *H04L 7/0041* (2013.01); *H04L 1/0061* (2013.01); *H04L 7/0008* (2013.01)

(58) Field of Classification Search
CPC ... H04L 7/0041; H04L 1/0061; H04L 7/0008; G11C 7/1093
USPC .......................... 375/371, 373, 357, 355, 354
See application file for complete search history.

(56) References Cited

U.S. PATENT DOCUMENTS 8,934,592 B2 * 1/2015 Shemesh ................ H04L 25/14 375/365
10,542,312 B1 * 1/2020 Bassett ................... H04L 7/042
2009/0207895 A1 * 8/2009 Park ..................... G11C 7/1093 375/219

* cited by examiner

*Primary Examiner* — Chieh M Fan
(74) *Attorney, Agent, or Firm* — Renner Otto; Christopher P. Harris

(57) ABSTRACT

One example includes a data alignment system. The system includes a bit alignment detector configured to detect bit-wise alignment of transmission signals provided from respective transmit channels based on a receiver signal provided by a remote receiver. The transmission signals can be combined to generate the receiver signal via a data combiner in the remote receiver. The system also includes a data alignment detector configured to detect alignment of data in each of the transmission signals. The system further includes a delay controller configured to provide at least one delay signal to at least one of the transmit channels to selectively delay a respective at least one of the transmission signals in response to at least one of the bit alignment detector failing to detect the bit-wise alignment of the transmission signals and the data alignment detector failing to detect alignment of the data in each of the transmission signals.

19 Claims, 8 Drawing Sheets

DATA ALIGNMENT SYSTEM

GOVERNMENT INTEREST

The invention was made under Government Contract. Therefore, the U.S. Government has rights to the invention as specified in that contract.

TECHNICAL FIELD

The present invention relates generally to computer systems, and specifically to a data alignment system.

BACKGROUND

Superconducting digital technology has provided computing and/or communications resources that benefit from unprecedented high speed, low power dissipation, and low operating temperature. Superconducting digital technology has been developed as an alternative to complementary metal oxide semiconductor (CMOS) technology, and typically comprises superconductor based single flux superconducting circuitry, utilizing superconducting Josephson junctions, and can exhibit typical signal power dissipation of less than 1 nW (nanowatt) per active device at a typical data rate of 20 Gb/s (gigabits/second) or greater, and can operate at temperatures of around 4 or fewer Kelvin.

Some superconducting circuits implement bias signals to trigger Josephson junctions to propagate single flux quantum (SFQ) pulses. Like traditional CMOS technology, data can be transferred in superconducting circuits based on an oscillating clock signal. Therefore, logic operations and other time-dependent signal transfer can occur in superconducting circuits based on the clock signal. One such example of superconducting circuits is reciprocal quantum logic (RQL), in which an AC clock signal provides the bias signals to trigger and untrigger the Josephson junctions, such as in a sequential sequence that is timed to specific phases of the AC clock signal. While it is simple to align data propagation in a given chip that is supplied with a clock signal, signal transfer between integrated circuits or from room temperature circuits to cryogenic temperature superconducting circuits can present challenges for time alignment.

SUMMARY

One example includes a data alignment system. The system includes a bit alignment detector configured to detect bit-wise alignment of transmission signals provided from respective transmit channels based on a receiver signal provided by a remote receiver. The transmission signals can be combined to generate the receiver signal via a data combiner in the remote receiver. The system also includes a data alignment detector configured to detect alignment of data in each of the transmission signals. The system further includes a delay controller configured to provide at least one delay signal to at least one of the transmit channels to selectively delay a respective at least one of the transmission signals in response to at least one of the bit alignment detector failing to detect the bit-wise alignment of the transmission signals and the data alignment detector failing to detect alignment of the data in each of the transmission signals.

Another example includes a method for aligning data of a plurality of transmission signals transmitted by a data transmitter. Each of the transmission signals can be provided as a sequence of data words. The method includes receiving a receiver signal from a remote receiver, the receiver signal being a logical combination of the transmission signals, and detecting a predetermined logic pattern in the receiver signal to determine bit-wise alignment of the transmission signals. The method also includes detecting a time offset of one of the data words in each of the transmission signals relative to a predetermined time to determine data word misalignment in the transmission signals. The method also includes detecting a data word offset of the data words in each of the transmission signals from a time of concurrent transmission to determine transmission phase misalignment of the transmission signals. The method further includes providing a delay signal to at least one of the transmit channels to selectively delay at least one of the transmission signals in response to at least one of determining bit-wise misalignment, the misalignment of the data words in the transmission signals, and the misalignment of the transmission phase of the transmission signals to align the data of the transmission signals.

Another example includes a data transmission system. The system includes a data receiver comprising a data combiner configured to receive a plurality of transmission signals and to combine the transmission signals to generate a receiver signal. Each of the transmission signals can be provided as data words having a predetermined logic pattern. The system also includes a data transmitter. The data transmitter includes a plurality of transmit channels configured to transmit the respective transmission signals. Each of the transmit channels can include a delay element. The data transmitter also includes a data alignment system configured to receive the receiver signal. The data alignment system includes a bit alignment detector configured to detect bit-wise alignment of the transmission signals based on detecting the predetermined logic pattern in the receiver signal. The data alignment system also includes a data word alignment detector configured to detect a time offset of one of the data words in each of the transmission signals relative to a predetermined time. The data alignment system also includes a data transmission alignment detector configured to detect a data word offset of the data words in each of the transmission signals from a time of concurrent transmission. The data alignment system further includes a delay controller configured to provide at least one delay signal to a respective at least one of the transmit channels to align the data in each of the transmission signals in response to at least one of the bit alignment detector failing to detect the bit-wise alignment of the transmission signals, the data word alignment detector detecting the time offset, and the data transmission alignment detector detecting the data word offset.

DETAILED DESCRIPTION

Figure 1:
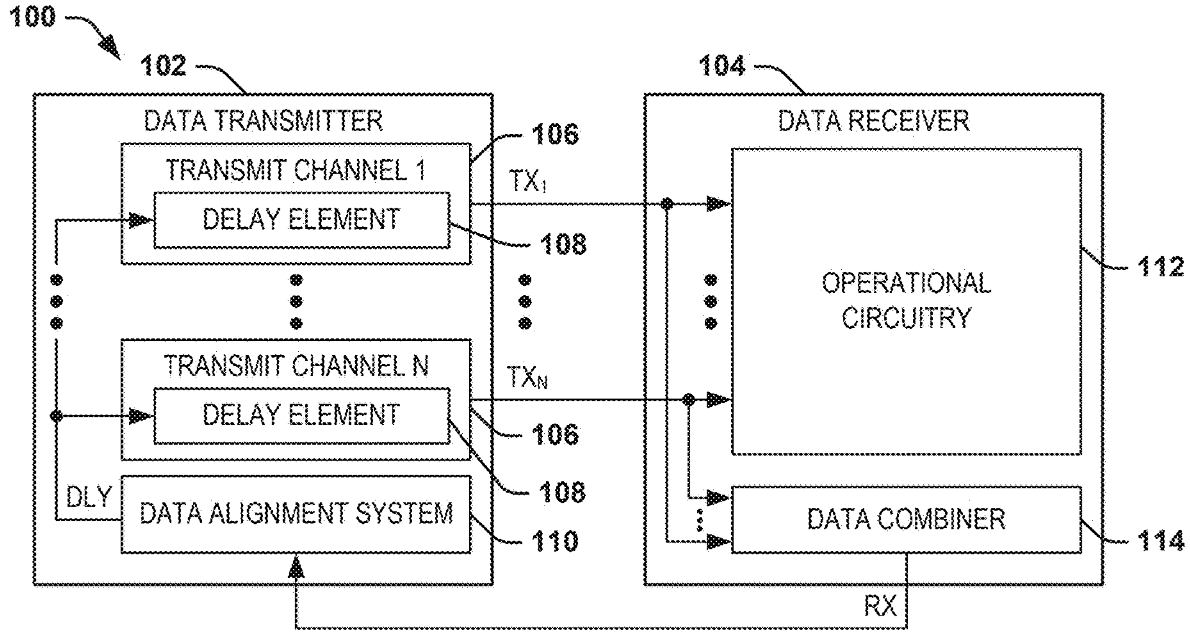
FIG. 1 illustrates an example of a data transmission system.

The present invention relates generally to computer systems, and specifically to a data alignment system. The data alignment system can be implemented in a data receiver in a data transmission system. The data transmission system can also include a data transmitter and a data receiver. The data transmitter can thus transmit a plurality of transmission signals to the data receiver across transmission lines that may have a difference in length and/or propagation delay. Therefore, the data alignment system can be configured to selectively delay the transmission signals to align the data that is transmitted from the data transmitter to the data receiver via the transmission signals. As described herein, the term "align the data of the transmission signals" corresponds to providing a zero clock cycle delay from concurrently transmitted data from all of the transmit channels from the data transmitter to the data receiver.

The data receiver can include a data combiner that can be configured as a set of logic configured to combine the transmission signals to generate a receiver signal. As an example, the transmission signals can each be provided as a sequence of data words, and can have a predetermined logic pattern. For example, the predetermined logic pattern can be a binary transition (e.g., between logic-1 and logic-0) at each cycle of the clock signal, and the logic can be configured as a logic-OR gate. Therefore, if the transmission signals are bit-wise aligned, the receiver signal will also have the predetermined logic pattern. However, in the example of the predetermined logic pattern being binary transitions, if one or more of the transmission signals is misaligned relative to the other transmission signal(s) by a single bit, the receiver signal is provided as a logic-1 at every cycle of the clock signal. The data alignment system can include a bit alignment detector that is configured to identify whether the transmission signals are bit-wise aligned by detecting the predetermined logic pattern in the receiver signal.

The data alignment system can also include a delay controller configured to provide delay signal(s) to the transmit channels to selectively delay the transmission signals to align the data of the transmission signals. As an example, in response to the bit alignment detector determining that the transmission signals are bit-wise misaligned, the bit alignment detector can command the delay controller to provide one or more delay signals to the data transmitter to selectively delay one or more of the transmission signals to provide bit-wise alignment of the transmission signals. For example, the delay signal(s) can provide for the selective delay as single bit delays that can be provided in every possible combination between the transmission signals until the bit alignment detector detects the bit-wise alignment. In response to detecting the predetermined logic pattern in the receiver signal, the bit alignment detector can determine that the transmission signals are bit-wise aligned.

The data alignment system also includes a data alignment detector. The data alignment detector is configured to align the data words and transmission phase of the transmission signals. For example, the data alignment detector can include a data word alignment detector that is configured to align the data words, such that each of the transmission signals provide a beginning of a data word concurrently to the data receiver. As an example, the data word alignment detector is configured to provide a trigger signal to the transmit channels to insert a predetermined code into a predetermined portion of a data word in each of the plurality of transmission signals in a sequence. The data word alignment detector can thus be configured to detect the predetermined code to determine a time offset based on a difference in cycles of a clock signal of the predetermined code relative to a predetermined number of cycles of the clock signal. The data word alignment detector can thus provide the time offset to the delay controller to selectively delay the respective transmission signal to equalize the number of cycles of the clock signal of the predetermined code with the predetermined number of cycles. The data word alignment detector can thus equalize the number of cycles of the clock signal of the predetermined code with the predetermined number of cycles for each of the transmission signals to align the data words of the transmission signals.

The data alignment detector can also include a data transmission alignment detector configured to align the transmission phase of the same data word across the transmission signals in response to alignment of the data words of the transmission signals. As described herein, the term "align the transmission phase of the transmission signals" refers to aligning the data words of the transmission signals such that concurrent transmission of the same data word of each of the transmission signals is concurrently received at the data receiver. As an example, the data transmission alignment detector is configured to provide a trigger signal to a set of the transmit channels to insert a sequential count value into a predetermined portion of a data word in each of a plurality of the transmission signals (e.g., a set of two or more of the transmission signals). The data transmission alignment detector can thus be configured to detect a data word offset between the plurality of the transmission signals based on a difference of the sequential count value between the plurality of the transmission signals. The data transmission alignment detector can thus provide the data word offset to the delay controller to selectively delay the respective transmission signal by one or more data words to align the transmission phase of the plurality of the transmission signals. The data transmission alignment detector can thus provide for concurrent transmission and receipt of the data words of the transmission signals.

Therefore, as described herein, multiple transmission signals can be data aligned based on detection and control from the receiver side of a transmission system. Such a data alignment system can operate for complementary oxide semiconductor (CMOS) circuits, but can also operate efficiently for superconducting circuits, such as reciprocal quantum logic (RQL), despite the operational challenges of superconducting circuits relative to CMOS circuits.

FIG. 1 illustrates an example of a data transmission system 100. The data transmission system 100 can be implemented in any of a variety of different types of circuit that provide electrical communication over transmission lines. As one example, the data transmission system 100 can be implemented in CMOS circuits for transmission of digital signals between integrated circuits or circuit boards across a bus or circuit traces. As another example, the data transmission system 100 can be implemented in a CMOS circuit and a superconducting circuit for transmission of pulses across a passive transmission line (PTL) to be converted to SFQ or RQL pulses, such as across a thermal barrier from a non-cryogenic environment to a cryogenic environment.

The data transmission system 100 includes a data transmitter 102 and a data receiver 104. The data transmitter 102 includes a plurality N of transmit channels 106 that are each configured to transmit a transmission signal TX (e.g., $TX_1$ through $TX_N$) to the data receiver 104. Each of the transmit channels 106 includes a delay element 108 that can provide for selective delay of the transmission signals TX to align the data of the transmission signals TX, as described in greater detail herein. As demonstrated in the example of FIG. 1, the data transmitter 102 also includes a data alignment system 110 that is configured to provide the selective delay of the transmission signals TX by providing one or more delay signals DLY to the delay elements 108.

The data receiver 104 includes operational circuitry 112 that is configured to receive the transmission signals TX and to perform an operational function of the circuit (e.g., processor or application specific integrated circuit (ASIC)) on which the data receiver 104 is included. Thus, the operational circuitry 112 can perform the operational function of the circuit at least partially in response to the received transmission signals TX. The data receiver 104 also includes a data combiner 114 that is also configured to receive the transmission signals TX and to generate a receiver signal RX that is provided to the data alignment system 110 in the data transmitter 102.

As an example, during an initial training mode (e.g., upon power-up of the data transmitter 102 and/or the data receiver 104), the data alignment system 110 can be configured to detect data misalignment of the transmission signals TX based on the receiver signal RX, and can provide the delay signal(s) DLY to indicate the misalignment of the transmission signals TX. The data alignment system 110 can thus provide the selective delay of the transmission signals TX via the delay elements 108 to align the data of the transmission signals TX. As described in greater detail herein, the detection of the misalignment, and the selective delay provided to the transmission signals TX, can be provided in a first stage of bit-wise alignment, a second stage of data word alignment, and a third stage of transmission phase alignment. Therefore, the alignment of the data of the transmission signals TX can occur in order from fine delay to coarse delay, as described herein.

Figure 2:
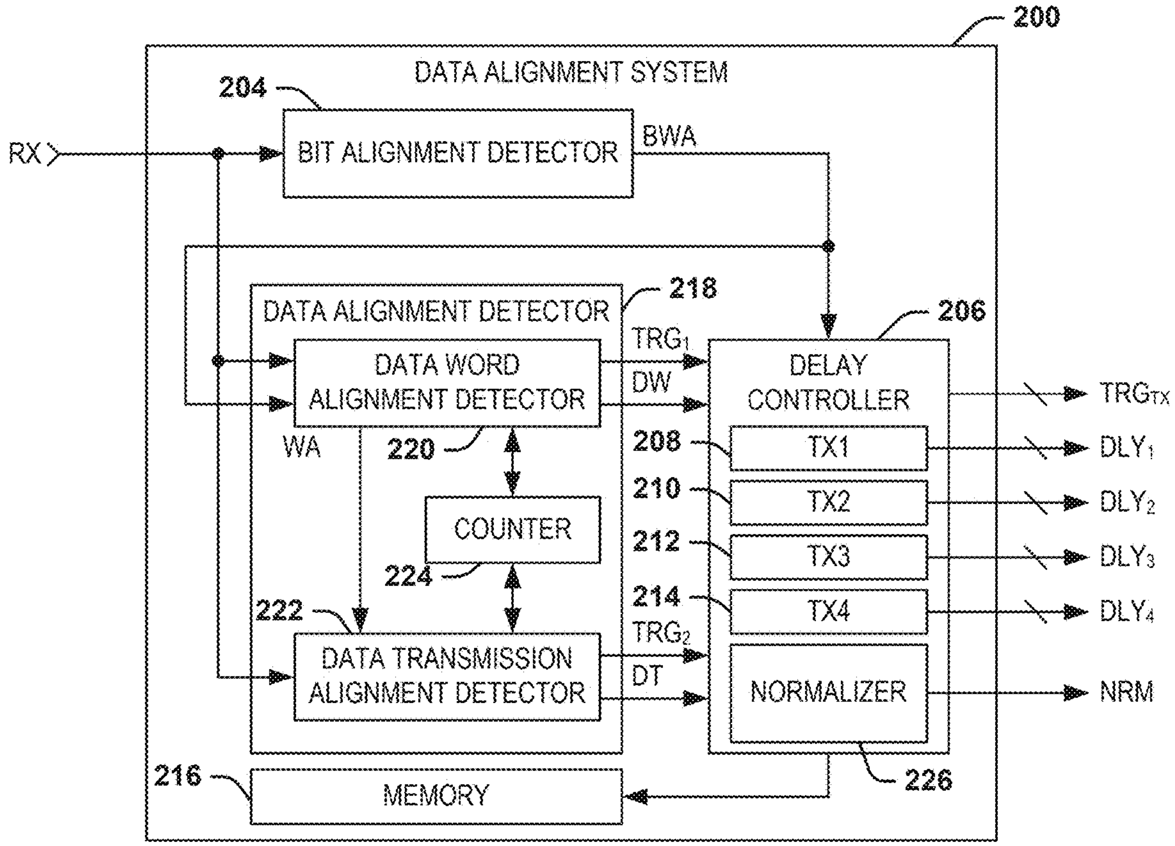
FIG. 2 illustrates an example of a data alignment system.

FIG. 2 illustrates an example of a data alignment system 200. The data alignment system 200 can correspond to the data alignment system 110 in the example of FIG. 1. Therefore, reference is to be made to the example of FIG. 1 in the following description of the example of FIG. 2.

The data alignment system 200 is demonstrated as receiving the receiver signal RX. In the example of FIG. 2 and hereafter, the receiver signal RX can be generated from a set of four transmission signals, referred to individually hereinafter as $TX_1$, $TX_2$, $TX_3$, and $TX_4$ and collectively referred to hereinafter as transmission signals TX. As described hereinafter, the operation of the data alignment system 200 is described as aligning the four transmission signals, but the operation of the data alignment system 200, as described herein, can apply to data alignment of more or fewer transmission signals.

The receiver signal RX can be generated by the data combiner 114 that is configured as a set of logic that is configured to provide a logical combination of the transmission signals TX. As an example, the logic can correspond to a logic-OR gate, such that the logic-OR gate provides a logic-OR operation of each concurrently received bit of the transmission signals TX to generate the receiver signal RX. As an example, the transmission signals TX can each be provided as a sequence of data words, and can have a predetermined logic pattern. For example, the predetermined logic pattern can be a binary transition (e.g., between logic-1 and logic-0) at each cycle of a clock signal (described hereinafter as "clock cycle"), such that each bit received in each of the transmission signals TX is a logic complement of the previously received bit.

As described herein, the clock signal can correspond to a system clock, and can be local to the data alignment system 200 and/or the data transmitter 102, or can be synchronized between the data transmitter 102 and the data receiver 104. As an example, such as for CMOS circuits, the clock signal can be generated by a local oscillator. As another example, the clock signal can correspond to an AC clock signal, such as an RQL clock signal for a superconducting circuit. Regardless, while the clock signal and clock generator is not demonstrated in the description or drawings herein, the clock signal can be present for various aspects of operation of the data transmission system 100.

In the example of FIG. 2, the data alignment system 200 includes a bit alignment detector 204 that is configured to identify whether the transmission signals TX are bit-wise aligned based on the receiver signal RX. As described above, each of the transmission signals includes a same predetermined logic pattern. Therefore, as an example, if the transmission signals TX are bit-wise aligned, the receiver signal RX can have the same predetermined logic pattern, such that the bit alignment detector 204 is configured to detect the predetermined logic pattern in the receiver signal RX to determine if the transmission signals TX are bit-wise aligned.

Figure 3:
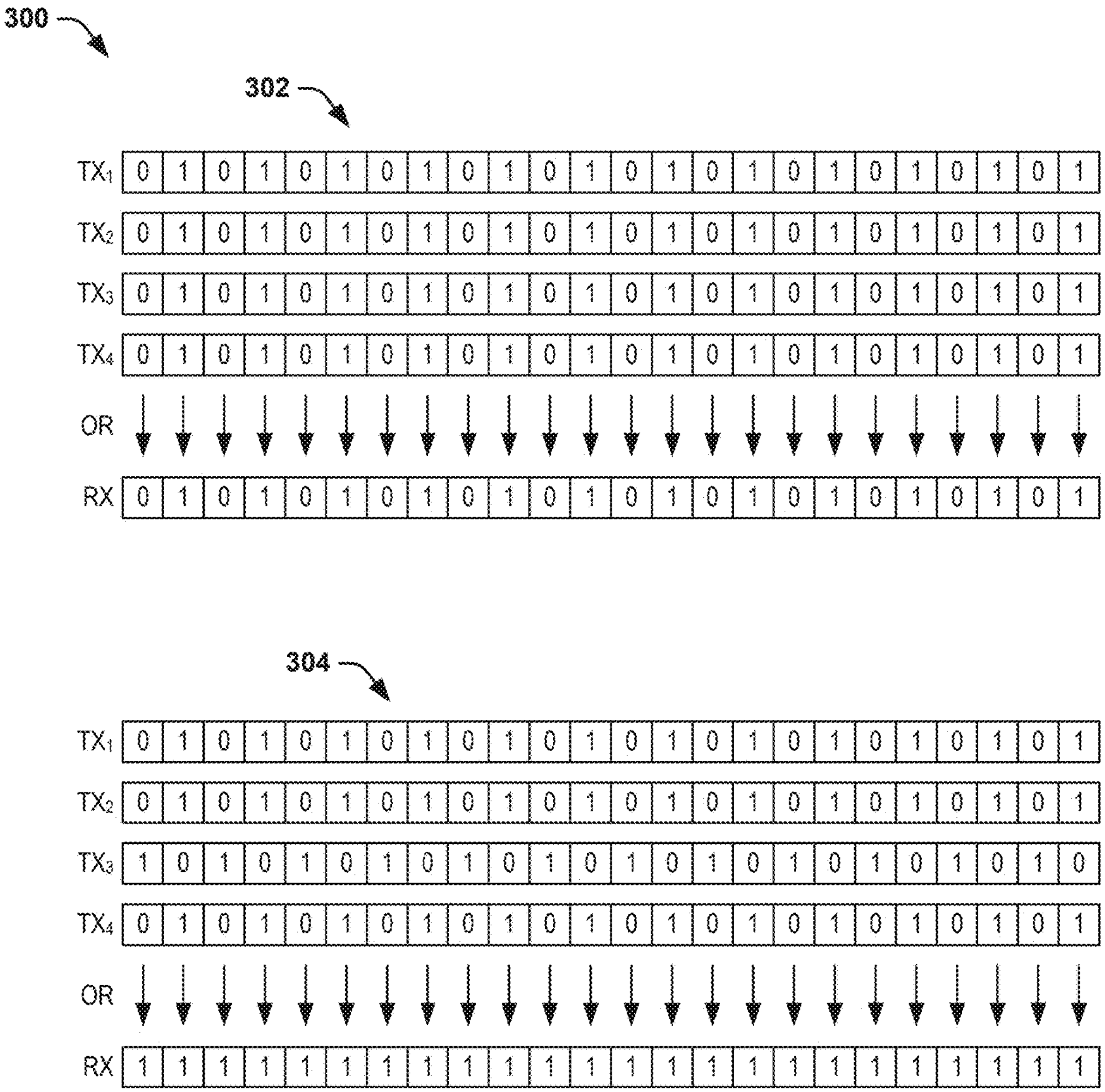
FIG. 3 illustrates an example diagram of determination of bit-wise alignment of transmission signals.

FIG. 3 illustrates an example diagram 300 of determination of bit-wise alignment of the transmission signals TX. In the example described above with reference to the example of FIG. 2, the predetermined logic pattern can correspond to a binary transition at each clock cycle. The diagram 300 demonstrates a first data set 302 and a second data set 304. Each of the data sets 302 and 304 demonstrates the four transmission signals $TX_1$ through $TX_4$ and the receiver signal RX. The first and second data sets 302 and 304 demonstrate a stream of bits, with each bit corresponding to a binary value of the respective transmission signals $TX_1$ through $TX_4$ and the receiver signal RX at a given clock cycle in time-aligned order from left to right. Therefore, each bit of the receiver signal RX corresponds to the output of the data combiner 114 at a given clock cycle resulting from the logic-OR operation (demonstrated as "OR") provided on the respective clock-aligned bits of the transmission signals $TX_1$ through $TX_4$.

Based on the logic-OR operation provided by the data combiner 114 on the transmission signals TX, if the transmission signals TX are bit-wise aligned, the receiver signal RX will have the same predetermined logic pattern of a binary transition at every clock cycle. The first data set 302 demonstrates bit-wise alignment of the transmission signals $TX_1$ through $TX_4$, in which each of transmission signals $TX_1$ through $TX_4$ has a same binary value at each clock cycle. As a result, based on the logic-OR operation, the receiver signal RX likewise includes the same binary value as each of the transmission signals $TX_1$ through $TX_4$ at each clock cycle. Therefore, the bit alignment detector 204 can determine the bit-wise alignment of the transmission signals TX based on identifying the predetermined logic pattern of the binary transitions in the receiver signal RX.

The second data set 304 demonstrates bit-wise misalignment of the transmission signals $TX_1$ through $TX_4$. Particularly, in the example of FIG. 3, the third transmission signal $TX_3$ is bit-wise misaligned with respect to the other transmission signals $TX_1$, $TX_2$, and $TX_4$. As a result, based on the logic-OR operation, the receiver signal RX exhibits a logic-1 at every clock cycle. Therefore, the second data set 304 demonstrates that if one or more of the transmission signals TX is misaligned relative to the other transmission signal(s) TX by a single bit, the logic-OR operation of the transmission signals TX results in a logic-1 at every clock cycle. Therefore, the bit alignment detector 204 can determine that the transmission signals TX are bit-wise misaligned based on identifying a constant logic-1 state at every clock cycle.

Referring back to the example of FIG. 2, the data alignment system 200 includes a delay controller 206 that is configured to provide delay signals DLY to the transmit channels 106 to selectively delay the transmission signals TX to align the data of the transmission signals TX. In the example of FIG. 2, the bit alignment detector 204 is configured to provide a signal BWA that is indicative of the bit-wise alignment or bit-wise misalignment of the transmission signals TX. The signal BWA is provided to the delay controller 206 to indicate that the transmission signals TX are bit-wise misaligned. The signal BWA can thus command the delay controller 206 to provide delay signals to the data transmitter 102 to selectively delay one or more of the transmission signals TX to provide bit-wise alignment of the transmission signals TX.

In the example of FIG. 2, the delay signals DLY are demonstrated as a first delay signal $DLY_1$ that is generated from a first transmit path controller ("$TX_1$") 208, a second delay signal $DLY_2$ that is generated from a second transmit path controller ("$TX_2$") 210, a third delay signal $DLY_3$ that is generated from a third transmit path controller ("$TX_3$") 212, and a fourth delay signal $DLY_4$ that is generated from a fourth transmit path controller ("$TX_4$") 214. As described herein, the delay signals DLY can each correspond to one or more digital signals that are provided to the transmit channels 106 to provide a delay of one or more cycles clock to the respective one of the transmission signals TX via the respective delay element 108. In response to the signal BWA, the delay controller 206 can implement a bit alignment algorithm to provide bit-wise alignment of the transmission signals TX via the delay signals DLY.

As an example, the bit alignment algorithm can provide selective single-bit delays via the delay signals DLY generated by the respective transmit path controllers 208, 210, 212, and 214. After each single-bit delay, the bit alignment detector 204 can determine if the transmission signals TX are bit-wise aligned based on identifying if the receiver signal RX has the predetermined logic pattern. If the bit alignment detector 204 does not identify the predetermined logic pattern in the receiver signal RX, the delay controller 206 can provide a single-bit delay on a different one of the transmission signals TX, thus allowing the bit alignment detector 204 to again determine if the transmission signals TX are bit-wise aligned based on identifying the predetermined logic code in the receiver signal RX. The bit alignment algorithm can thus iteratively provide the single bit-delays in different combinations of the transmission signals TX until the bit alignment detector 204 determines that the transmission signals TX are bit-wise aligned by identifying the predetermined logic code in the receiver signal RX.

Figure 4:
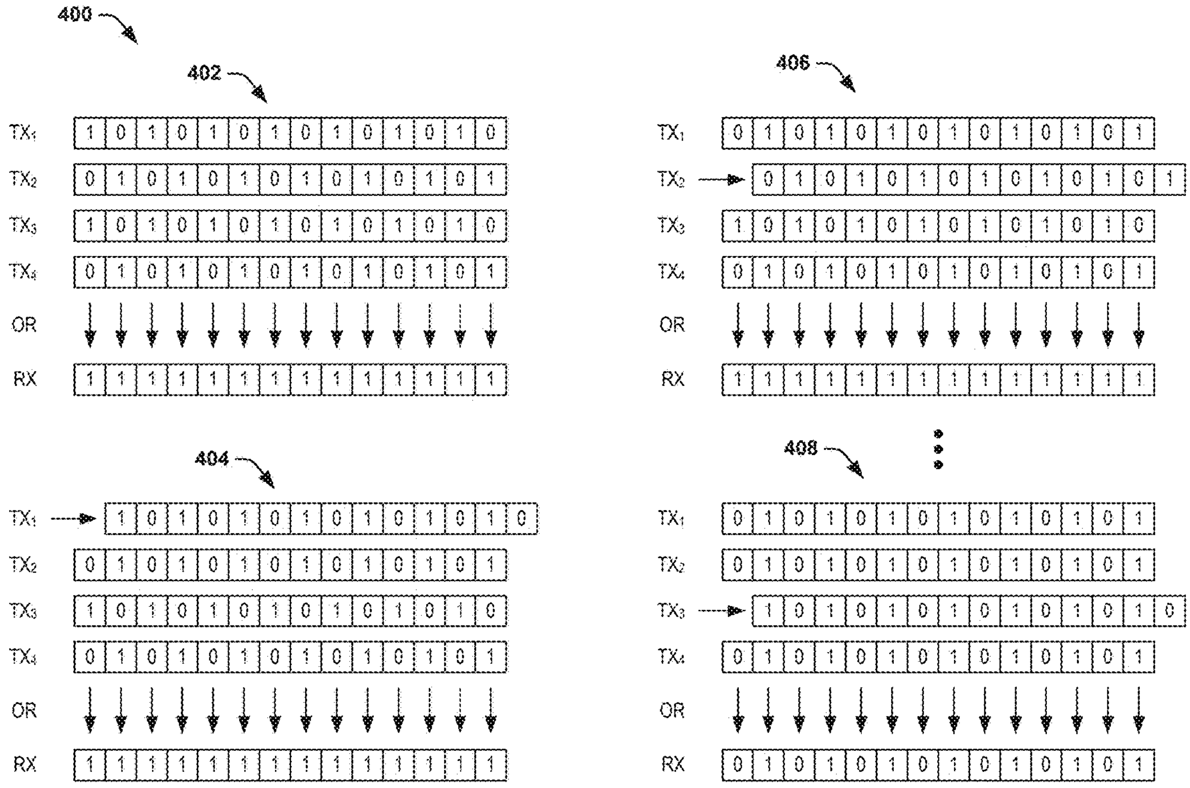
FIG. 4 illustrates an example diagram of a bit alignment algorithm.

FIG. 4 illustrates an example diagram 400 of a bit alignment algorithm. The diagram 400 demonstrates a first data set 402, a second data set 404, a third data set 406, and a fourth data set 408. Each of the data sets 402, 404, 406, and 408 demonstrates the four transmission signals $TX_1$ through $TX_4$ and the receiver signal RX. The data sets 402, 404, 406, and 408 demonstrate a stream of bits, with each bit corresponding to a binary value of the respective transmission signals $TX_1$ through $TX_4$ and the receiver signal RX at a given clock cycle in time-aligned order from left to right. Therefore, each bit of the receiver signal RX corresponds to the output of the data combiner 114 at a given clock cycle resulting from the logic-OR operation provided on the respective clock-aligned bits of the transmission signals $TX_1$ through $TX_4$.

In the first data set 402, the transmission signals $TX_1$ through $TX_4$ are demonstrated as bit-wise misaligned. Particularly, in the example of FIG. 4, the first transmission signal $TX_1$ and the third transmission signal $TX_3$ are bit-wise misaligned with respect to the second transmission signal $TX_2$ and the fourth transmission signal $TX_4$. As a result, based on the logic-OR operation, the receiver signal RX exhibits a logic-1 at every clock cycle. In response to receiving the receiver signal RX in the first data set 402, the bit alignment detector 204 provides the signal BWA to the delay controller 206 to implement the bit alignment algorithm.

As described above, the bit alignment algorithm provides selective single-bit delays via the delay signals DLY generated by the respective transmit path controllers 208, 210, 212, and 214. In the second data set 404, the bit alignment algorithm begins by providing a single-bit delay of the first transmission signal $TX_1$. In response to providing the single-bit delay of the first transmission signal $TX_1$, the bit alignment detector 204 determines if the transmission signals TX are bit-wise aligned based on identifying if the receiver signal RX has the predetermined logic pattern. In the second data set 404, the single-bit delay of the first transmission signal $TX_1$ provides bit-wise alignment of the first transmission signal $TX_1$ with the second transmission signal $TX_2$ and the fourth transmission signal $TX_4$. However, the third transmission signal $TX_3$ is still bit-wise misaligned with the remaining transmission signals $TX_1$, $TX_2$, and $TX_4$. Therefore, the receiver signal RX exhibits a logic-1 at every clock cycle, thereby indicating continued bit-wise misalignment of the transmission signals TX.

As described above, if the bit alignment detector 204 does not identify the predetermined logic pattern in the receiver signal RX, the delay controller 206 can provide a single-bit delay on a different one of the transmission signals TX, thus allowing the bit alignment detector 204 to again determine if the transmission signals TX are bit-wise aligned based on identifying the predetermined logic code in the receiver signal RX. As an example, the bit alignment detector 204 is agnostic as to bit-wise alignment of any given one of the transmission signals TX with less than all other transmission signals TX. Therefore, the bit alignment detector 204 can continue implementing the bit alignment algorithm in all different combinations, and thus up to all $2^N$ combinations, where N corresponds to the number of different transmission signals TX. In the example of FIG. 4, after the single-bit delay provided to the first transmission signal $TX_1$, the bit alignment algorithm can thus delay the second transmission signal $TX_2$, as demonstrated in the third data set 406. The bit alignment detector 204 can again determine if the transmission signals TX are bit-wise aligned. Upon determining that the transmission signals TX are bit-wise misaligned, as demonstrated in the third data set 406, the bit alignment algorithm can continue to the next iteration until the bit alignment detector 204 determines bit-wise alignment.

After one or more additional iterations of the bit alignment algorithm, in the fourth data set 408, the third transmission signal $TX_3$ is single-bit delayed. In response to the single-bit delay in the fourth data set 408, the receiver signal RX finally exhibits the predetermined logic code as the alternating binary transitions at each clock cycle. Therefore, the bit alignment detector 204 determines that the transmission signals TX are bit-wise aligned, and concludes the bit-wise alignment portion of the data alignment of the transmission signals.

Referring back to the example of FIG. 2, upon determining that the transmission signals TX are bit-wise aligned, the bit alignment detector 204 can indicate the bit-wise alignment of the transmission signals TX via the signal BWA. In the example of FIG. 2, the data alignment system 200 includes a memory 216. As an example, the delay controller 206 can store the total amount of delay that was provided via each of the delay signals DLY to the transmit channels 106 for each of the respective transmission signals TX.

The data alignment system 200 also includes a data alignment detector 218. The data alignment detector 218 includes a data word alignment detector 220, a data transmission alignment detector 222, and a counter 224. As described above, the transmission signals TX can be provided as a sequence of data words having a defined quantity of bits. During the initial training mode, each of the data words can be provided having the predetermined logic pattern, such that the data words of each of the transmission signals TX can be identical. The data word alignment detector 220 is configured to align the data words of the transmission signals TX. Therefore, the alignment of the data words results in a beginning of each data word of each of the transmission signals TX being providing concurrently to the data receiver 104.

Figure 5:
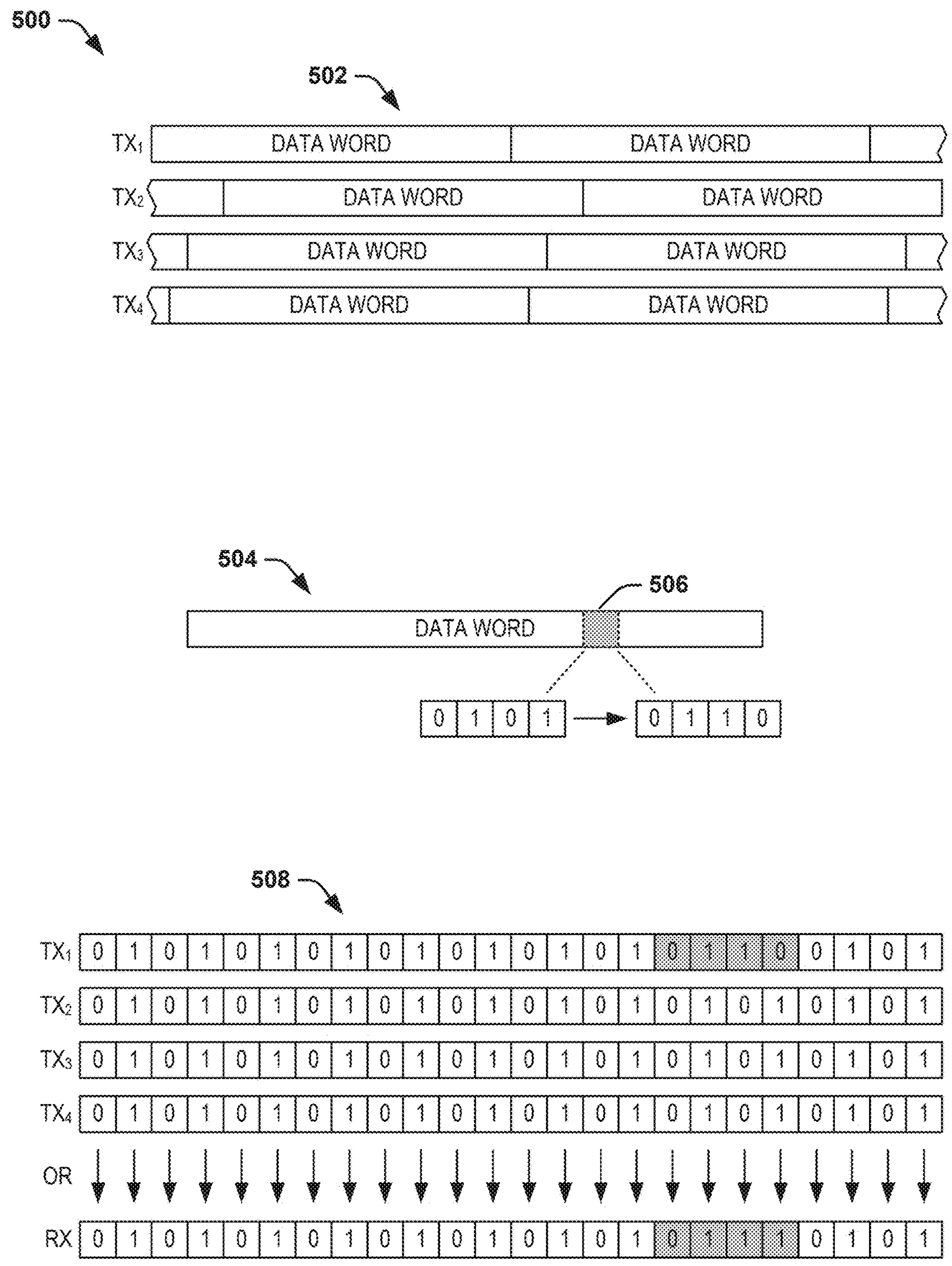
FIG. 5 illustrates an example diagram of data word alignment.

FIG. 5 illustrates an example diagram 500 of data word alignment. The diagram 500 demonstrates a first data set 502 that includes the transmission signals TX. In the example of FIG. 5, while the transmission signals TX can be bit-wise aligned with respect to each other, the first data set 502 is demonstrated as data word-wise misaligned, and thus have a time offset between data word transitions relative to each other. Particularly, for the transmission signals TX demonstrated in the example of FIG. 5, for data flow from left to right, the data word of the first transmission signal $TX_1$ is received at the data receiver 104 first, followed by the data word of the fourth transmission signal $TX_4$, followed by the data word of the third transmission signal $TX_3$, followed by the data word of the second transmission signal $TX_2$.

With additional reference to FIG. 2, to align the data words of the transmission signals TX, the data word alignment detector 220 is configured to implement a data word alignment algorithm. The data word alignment algorithm can include inserting a predetermined code into a predetermined portion of a data word in each of the plurality of transmission signals TX in a sequence. In the example of FIG. 2, in response to receiving the signal BWA that is indicative of the bit-wise alignment of the transmission signals TX, the data word alignment detector 220 provides a trigger signal $TRG_1$ to the delay controller 206. In response, the delay controller 206 provides a trigger signal $TRG_{TX}$ to the data transmitter 102. Additionally, upon providing the trigger signal $TRG_1$ to the delay controller 206, as part of the data word alignment algorithm, the data word alignment detector 220 can begin counting clock cycles via the counter 224.

In response to receiving the trigger signal $TRG_{TX}$, the data transmitter 102 can insert the predetermined code into the predetermined portion of a data word of a given one of the transmission signals TX (e.g., the first transmission signal $TX_1$). In the example of FIG. 5, the diagram 500 demonstrates a data word at 504. The data word 504 includes a predetermined portion 506 at which the predetermined code is inserted. In the example of FIG. 5, the predetermined code is demonstrated as a four-bit sequence "0110" that replaces the binary transition "0101" of the predetermined logic pattern of the transmission signal TX in the particular predetermined portion 506. The data word alignment detector 220 can thus be configured to monitor the receiver signal RX to detect the predetermined code in the receiver signal RX.

The example of FIG. 5 demonstrates a second data set 508. The second data set 508 demonstrates the four transmission signals $TX_1$ through $TX_4$ and the receiver signal RX. The second data set 508 demonstrates a stream of bits, with each bit corresponding to a binary value of the respective transmission signals $TX_1$ through $TX_4$ and the receiver signal RX at a given clock cycle in time-aligned order from left to right. Therefore, each bit of the receiver signal RX corresponds to the output of the data combiner 114 at a given clock cycle resulting from the logic-OR operation provided on the respective clock-aligned bits of the transmission signals $TX_1$ through $TX_4$. In the second data set 508, the first transmission signal $TX_1$ is demonstrated as including the predetermined code, demonstrated in the example of FIG. 5 as the four-bit sequence "0110" having replaced the binary transition "0101" of the predetermined logic pattern of the first transmission signal $TX_1$ at the predetermined portion at 510. As a result of the logic-OR operation, the receiver signal RX is provided at the time-aligned predetermined portion as a four-bit sequence "0111". Therefore, the data word alignment detector 220 can detect the predetermined code in the first transmission signal $TX_1$ based on the four-bit sequence "0111" in the receiver signal RX.

As described above, the data word alignment detector 220 can begin counting clock cycles in response to providing the trigger signal $TRG_1$. In response to detecting the predetermined code in the first transmission signal $TX_1$, the data word alignment detector 220 can stop counting the clock cycles. Therefore, the data word alignment detector 220 can determine a quantity of clock cycles of delay between commanding transmission of the data word that includes the predetermined code and detecting the predetermined code in the first transmission signal $TX_1$ based on detecting the four-bit sequence "0111" that is indicative of the predetermined code in the receiver signal RX.

Upon determining the count value of clock cycles of delay of propagation of the data word in the first transmission signal $TX_1$ to the data receiver 104, the data word alignment detector 220 can proceed to the second transmission signal $TX_2$ by providing the trigger signal $TRG_1$ again, thus commanding the delay controller 206 to provide the trigger signal $TRG_{TX}$, which can thus command the data transmitter 102 to insert the predetermined code (e.g., the same predetermined code) into the predetermined portion of a data word of second the transmission signal $TX_2$. Accordingly, the data word alignment detector 220 can step through each of the transmission signals TX in a sequence, counting the clock cycles of propagation between insertion of the predetermined code and receipt of indication of the predetermined code in the receiver signal RX for each of the respective transmission signals TX.

In response to counting the clock cycles for a given one of the transmission signals TX, the data word alignment detector 220 can thus determine a time offset (e.g., in clock cycles) between the data word of the respective one of the transmission signals TX relative to a predetermined time. For example, the predetermined time can correspond to a predefined quantity of clock signals to which the data words of the transmission signals TX can be time aligned by clock cycles. As an example, the predetermined time can correspond to an arbitrary quantity of clock cycles, such as based on an estimated propagation time of the transmission signals TX, to which all of the transmission signals TX can be aligned by the data word alignment detector 220. As another example, the quantity of clock cycles counted by data word alignment detector 220 between the trigger signal $TRG_1$ and the detection of the predetermined code in the first transmission signal $TX_1$ by the data word alignment detector 220 via the receiver signal RX can correspond to the predetermined time. Therefore, the time offset for the first transmission signal $TX_1$ can be zero clock cycles based on the propagation time of the first transmission signal $TX_1$ defining the predetermined time. Accordingly, the time offset of the remaining transmission signals TX can be time-aligned to the predetermined time that is defined by the clock cycle propagation time of the first transmission signal $TX_1$.

In response to determining the time offset for each of the transmission signals TX, the data word alignment detector 220 can provide the time offset to the delay controller 206, demonstrated in the example of FIG. 2 as a signal DW, to selectively delay the respective transmission signals TX via the delay signals DLY. Therefore, the data word alignment detector 220 can equalize the number of clock cycles of receipt of the predetermined code with the number of clock cycles of the predetermined time for each of the transmission signals TX to align the data words of the transmission signals TX.

Figure 6:
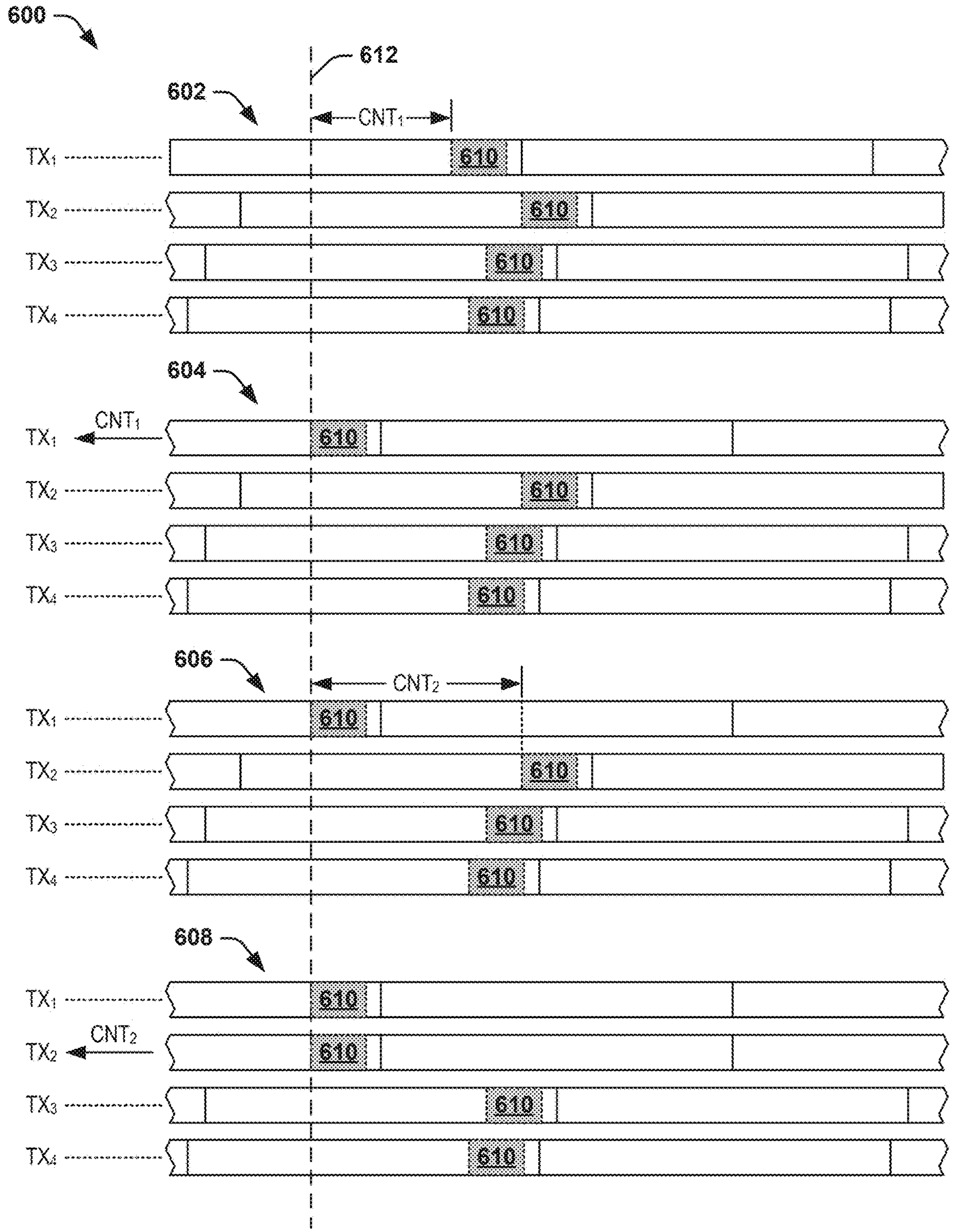
FIG. 6 illustrates another example diagram of a data word alignment algorithm.

FIG. 6 illustrates another example diagram 600 of a data word alignment algorithm. The diagram 600 demonstrates four sets of data that each include the transmission signals $TX_1$ through $TX_4$. The data sets are demonstrated as a first data set 602, a second data set 604, a third data set 606, and a fourth data set 608. In the example of FIG. 6, while the transmission signals TX can be bit-wise aligned with respect to each other, the data sets 602, 604, 606, and 608 are demonstrated as data word-wise misaligned. In the example of FIG. 6, the transmission signals TX in the first data set 602 are demonstrated similar to the data set 502 example of FIG. 5, such that the data word of the first transmission signal $TX_1$ is received at the data receiver 104 first, followed by the data word of the fourth transmission signal $TX_4$, followed by the data word of the third transmission signal $TX_3$, followed by the data word of the second transmission signal $TX_2$.

In the example of FIG. 6, each of the transmission signals TX is demonstrated as including a predetermined portion, demonstrated at 610, in which the predetermined code is inserted by the data transmitter 102 in response to the trigger signal $TRG_{TX}$ provided by delay controller 206, and thus in response to the trigger signal $TRG_1$ provided by the data word alignment detector 220. For example, the predetermined code can be the bit-sequence "0110", such that to provide the bit-sequence "0111" as detected in the receiver signal RX by the data word alignment detector 220.

In response to detecting the predetermined code in the first transmission signal $TX_1$, the data word alignment detector 220 can have determined a count value of the number of clock cycles of propagation of the first transmission signal $TX_1$ between the trigger signal $TRG_1$ and detecting the predetermined code in the receiver signal RX. The data word alignment detector 220 can thus compare the number of clock cycles of the propagation of the first transmission signal $TX_1$ with a predetermined time (e.g., in clock cycles), demonstrated in the example of FIG. 6 at 612. As an example, the predetermined time 612 can correspond to an arbitrary quantity of clock cycles, such as based on an estimated propagation time of the transmission signals TX. Thus, the data word alignment detector 220 can determine a time offset between the data word of the first transmission signal $TX_1$ and the predetermined time 612 as a difference $CNT_1$.

In response to determining the time offset $CNT_1$, the data word alignment detector 220 can provide the time offset $CNT_1$ to the delay controller 206. The delay controller 206 can thus provide the delay signal $DLY_1$ to the data transmitter 102, such that the data transmitter 102 can delay the first transmission signal $TX_1$ by a quantity of clock cycles equal to the time offset $CNT_1$. The second data set 604 demonstrates the delay of the first transmission signal $TX_1$ by the time offset $CNT_1$, such that the predetermined portion 610 of the predetermined code is time-aligned (e.g., by clock cycles) with the predetermined time 612.

In the third data set 606, in response to detecting the predetermined code in the second transmission signal $TX_2$, the data word alignment detector 220 can have determined a count value of the number of clock cycles of propagation of the second transmission signal $TX_2$ between the trigger signal $TRG_1$ and detecting the predetermined code in the receiver signal RX. The data word alignment detector 220 can thus compare the number of clock cycles of the propagation of the second transmission signal $TX_2$ with the predetermined time 612. Thus, the data word alignment detector 220 can determine a time offset between the data word of the second transmission signal $TX_2$ and the predetermined time 612 as a difference $CNT_2$.

In response to determining the time offset $CNT_2$, the data word alignment detector 220 can provide the time offset $CNT_2$ to the delay controller 206. The delay controller 206 can thus provide the delay signal $DLY_2$ to the data transmitter 102, such that the data transmitter 102 can delay the second transmission signal $TX_2$ by a quantity of clock cycles equal to the time offset $CNT_2$. The fourth data set 608 demonstrates the delay of the second transmission signal $TX_2$ by the time offset $CNT_2$, such that the predetermined portion 610 of the predetermined code is time-aligned (e.g., by clock cycles) with the predetermined time 612.

As also demonstrated in the fourth data set 608, after delaying the first transmission signal $TX_1$ by the time offset $CNT_1$ and delaying the second transmission signal $TX_2$ by the time offset $CNT_2$, the data words of the first and second transmission signals $TX_1$ and $TX_2$ are demonstrated as time aligned. The data word alignment detector 220 can thus continue the data word alignment algorithm to time-align the predetermined portion 610 of the third transmission signal $TX_3$ with the predetermined time 612, followed by time-aligning the predetermined portion 610 of the fourth transmission signal $TX_4$ with the predetermined time 612. Upon time-aligning all of the transmission signals TX to the predetermined time 612, the data words of all of the transmission signals TX will thus be time aligned with respect to each other, such that the data receiver 104 receives a beginning of a data word of each of the transmission signals concurrently.

The examples of FIGS. 5 and 6 demonstrate one example of implementation of the data word alignment algorithm. Other examples can be implemented, such as the predetermined portion 610 of each of the transmission signals TX, the predetermined code, the predetermined time 612, and/or the order of detecting the predetermined code in the receiver signal RX and the delay of the respective transmission signals TX. Accordingly, the data word alignment algorithm can be implemented in a variety of ways.

Referring back to the example of FIG. 2, upon conclusion of the data word alignment of the transmission signals TX, the data word alignment detector 220 provides a word alignment signal WA to the data transmission alignment detector 222. Additionally, the delay controller 206 can store in the memory 216 the total amount of delay that was provided via each of the delay signals DLY to the transmit channels 106 for each of the respective transmission signals TX resulting from the data word-wise alignment. For example, the memory 216 can include a register for each of the transmission signals TX, such that the amount of delay (e.g., in clock cycles) that was determined for the word-wise alignment of the transmission signals TX can be added to the amount of delay that was determined for the bit-wise alignment of the transmission signals TX.

In response to receiving the word alignment signal WA, the data transmission alignment detector 222 is configured to align the transmission phase of the same data word across the transmission signals TX. Similar to as describe above, during the initial training mode, each of the data words can be provided having the predetermined logic pattern, such that the data words of each of the transmission signals TX can be identical. However, a given data word of one of the transmission signals TX can be out of phase by one or more whole data words relative to a concurrently transmitted data word of another one of the transmission signals TX. The data transmission alignment detector 222 is configured to align the beginning of concurrently transmitted data words of the transmission signals TX. As described herein, "concurrent transmission" of the transmission signals TX refers to the transmission signals TX being provided from the respective transmit channels 106 before being delayed by the delay elements 108. Therefore, the alignment of the data transmission results in concurrently transmitted data words of the transmission signals TX being concurrently received at the data receiver 104.

To align the data transmission of the transmission signals TX, the data transmission alignment detector 222 is configured to implement a data transmission alignment algorithm. The data transmission alignment algorithm can include inserting either a sequential count value or a null value in each of a pair of predetermined portions of a data word in each of the plurality of transmission signals TX in a sequence. In the example of FIG. 2, in response to receiving the signal WA that is indicative of the word-wise alignment of the transmission signals TX, the data transmission alignment detector 222 provides a trigger signal $TRG_2$ to the delay controller 206. In response, the delay controller 206 provides the trigger signal $TRG_{TX}$ to the data transmitter 102.

Upon providing the trigger signal $TRG_2$, the data transmission alignment detector can designate one of the transmission signals TX (e.g., the first transmission signal $TX_1$) as a reference transmission signal, and can sequentially and individually align the transmission phase of the data words of the other transmission signals TX to the reference transmission signal. For example, in response to receiving the trigger signal $TRG_{TX}$, the data transmitter 102 can insert the sequential count value into a first one of the predetermined portions and a null value in the second one of the predetermined portions of each data word of the reference transmission signal. Additionally, the data transmitter 102 can insert the sequential count value into the second one of the predetermined portions and the null value in the second one of the predetermined portions of each data word of another one of the transmission signals TX. Therefore, the data transmission alignment detector 222 can detect a data word offset based on a difference between the sequential count values in the first and second predetermined portions, as provided on the receiver signal RX.

Figure 7:
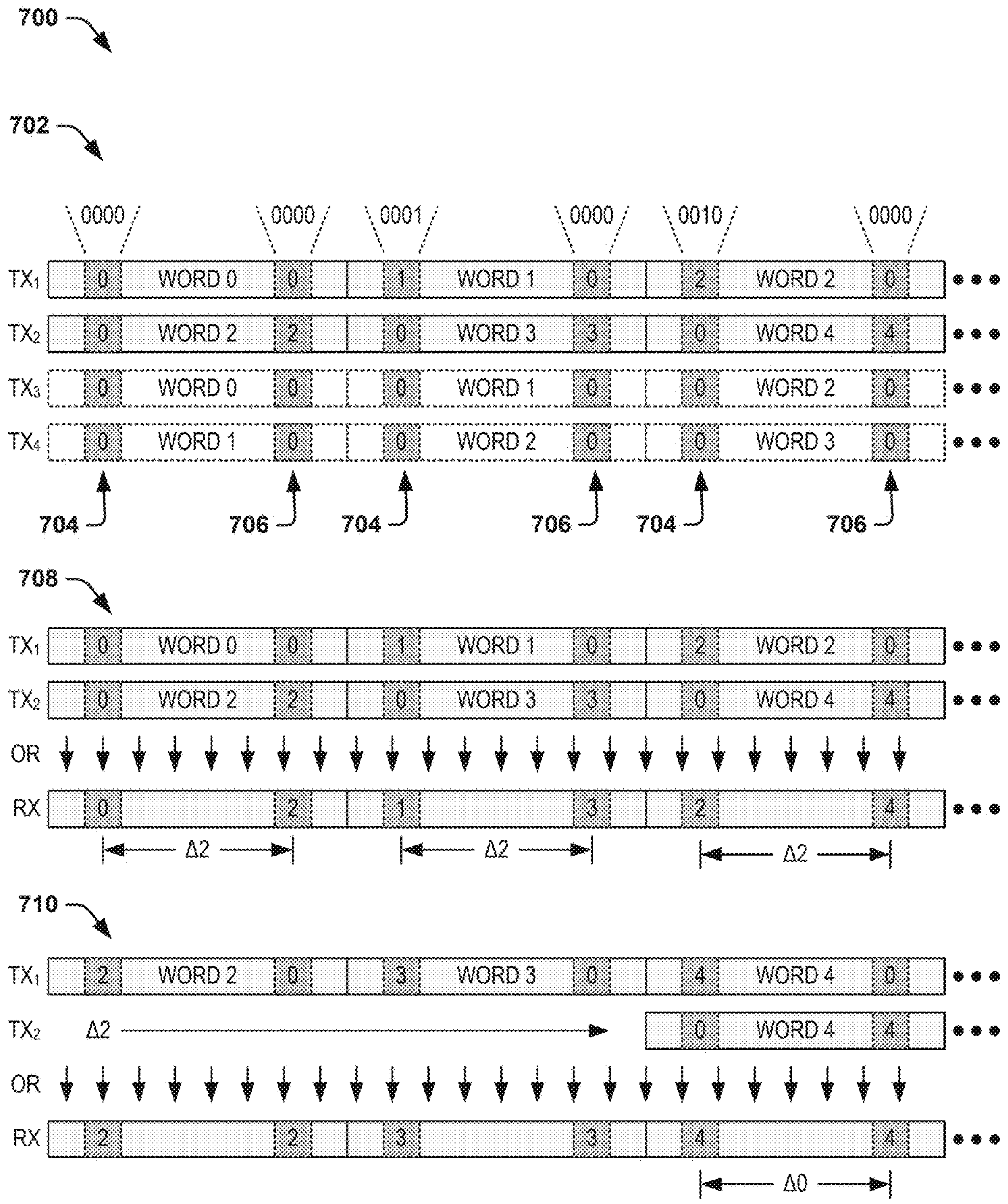
FIG. 7 illustrates an example diagram of data transmission alignment.

FIG. 7 illustrates an example diagram 700 of a data transmission alignment algorithm. The diagram 700 demonstrates four sets of data. A first set of data 702 includes the transmission signals $TX_1$ through $TX_4$. In the example of FIG. 7, the transmission signals TX are demonstrated as bit-wise aligned and data word-wise aligned with respect to each other, but the transmission phase of the transmission signals TX is misaligned. The first data set 702 demonstrates each of the transmission signals TX as a sequence of aligned data words that are numbered in order of transmission from the respective transmit channels 106, beginning with number zero and incrementing by one with each new data word. Therefore, DATA WORD 0 is transmitted concurrently from each of the transmit channels 106, followed by DATA WORD 1, etc. In the example of FIG. 7, the transmission signals TX are demonstrated such that the DATA WORD 0 of the second transmission signal $TX_2$ is received at the data receiver 104 first, followed by the DATA WORD 0 of the fourth transmission signal $TX_4$, followed by concurrent receipt of DATA WORD 0 of each of the first transmission signal $TX_1$ and the third transmission signal $TX_3$.

In the example of FIG. 7, each of the transmission signals TX is demonstrated as including a first predetermined portion 704 and a second predetermined portion 706, with the first predetermined portion 704 being more proximal to a leading edge of the respective data words. The predetermined portions 704 and 706 correspond to portions of the data words in which either the sequential count value or the null value is inserted by the data transmitter 102 in each of the sequentially transmitted data words in each of the respective transmission signals TX. In the example of FIG. 7, the diagram 700 can demonstrate transmission phase alignment of the second transmission signal $TX_2$ to the first transmission signal $TX_1$ that is designated as the reference transmission signal.

In response to the trigger signal $TRG_{TX}$ provided by delay controller 206, and thus in response to the trigger signal $TRG_2$ provided by the data transmission alignment detector 222, the data transmitter 102 can insert each of the sequential count values and the null values as a four-bit binary code. As demonstrated in the example of FIG. 7, the sequential count value is thus demonstrated as "0000", "0001", "0010", "0011", etc., and the null value is demonstrated as "0000". For simplicity of demonstration, the sequential count values are provided in the diagram 700 in the data words in Arabic numerals corresponding to the respective four-bit binary codes (and thus numbering from 0 to 15). Because the first and second predetermined portions 704 and 706 are in the same location of the data word-wise aligned transmission signals TX, a logic-OR operation of a sequential count value with a null value results in the sequential count value being detected in the receiver signal RX.

In the example of FIG. 7, in response to receiving the trigger signal $TRG_{TX}$, the data transmitter 102 inserts the sequential count value into the first predetermined portion 704 and the null value in the second predetermined portion 706 of each data word of the first transmission signal $TX_1$ (e.g., the reference transmission signal). Additionally, the data transmitter 102 inserts the sequential count value into the second predetermined portion 706 and the null value in the first predetermined portion 704 of each data word of the second transmission signal $TX_2$. Furthermore, the data transmitter 102 inserts the null value into the first and second predetermined portions 704 and 706 of the third and fourth transmission signals $TX_3$ and $TX_4$ while the data transmission alignment detector 222 aligns the transmission phase of the second transmission signal $TX_2$ to the transmission phase of the first transmission signal $TX_1$.

As described above, because the first and second predetermined portions 704 and 706 are in the same location of the data word-wise aligned transmission signals TX, the logic-OR operation provided by the data combiner 114 of a sequential count value with a null value results in the sequential count value being detected in the receiver signal RX. The diagram 700 includes a second set of data 708 that demonstrates the first and second transmission signals $TX_1$ and $TX_2$, as well as the receiver signal RX resulting from the logic-OR operation of the first and second transmission signals $TX_1$ and $TX_2$. In the second data set 708, the receiver signal RX is thus demonstrated as including the sequential count value of the first transmission signal $TX_1$ in the first predetermined portion 704 and the sequential count value of the second transmission signal $TX_2$ in the second predetermined portion 706. Therefore, to determine the data word offset, and thus the transmission phase misalignment, between the first and second transmission signals $TX_1$ and $TX_2$, the data transmission alignment detector 222 can determine the difference in the sequential count values in each data word of the receiver signal RX. In the example of FIG. 7, the data transmission alignment detector 222 detects that the first and second transmission signals $TX_1$ and $TX_2$ have a data word offset of two data words, demonstrated as $\Delta 2$.

In response to detecting the data word offset $\Delta 2$ between the first and second transmission signals $TX_1$ and $TX_2$, the data transmission alignment detector 222 can provide the data word offset 42 to the delay controller 206. The delay controller 206 can thus provide the delay signal $DLY_2$ to the data transmitter 102, such that the data transmitter 102 can delay the second transmission signal $TX_2$ by the data word offset 42 (e.g., clock cycles equal to two entire data words). Therefore, the delay of the second transmission signal $TX_2$ by the data word offset $\Delta 2$ results in the transmission phase of the first and second transmission signals $TX_1$ and $TX_2$ being time-aligned, and thus exhibiting a subsequent data word offset of zero, demonstrated as $\Delta 0$. Therefore, as demonstrated in the third data set 710, the DATA WORD 4 of each of the first and second transmission signals $TX_1$ and $TX_2$ is received at the data receiver 104 concurrently.

The data transmission alignment detector 222 can thus subsequently apply the data transmission alignment algorithm to the third transmission signal $TX_3$ to align the third transmission signal $TX_3$ with the first and second transmission signals $TX_1$ and $TX_2$. Because the third transmission signal $TX_3$ arrives concurrently with the first transmission signal $TX_1$, the data transmission alignment detector 222 can detect a data word offset of 40 in the receiver signal RX, and thus provides no delay to either the third transmission signal $TX_3$ or the already evaluated transmission signals $TX_1$ and $TX_2$. The data transmission alignment detector 222 can then subsequently apply the data transmission alignment algorithm to the fourth transmission signal $TX_4$ to align the fourth transmission signal $TX_4$ with the other transmission signals $TX_1$ through $TX_3$. Because the fourth transmission signal $TX_3$ arrives one data word sooner than the first transmission signal $TX_1$, the data transmission alignment detector 222 can detect a data word offset of $\Delta 1$ in the receiver signal RX, and thus delays the fourth transmission signal $TX_4$ by one data word. Accordingly, the data transmission alignment algorithm concludes with the transmission phase alignment of all four of the transmission signals TX.

The examples of FIG. 7 demonstrates one example of implementation of the data transmission alignment algorithm. Other examples can be implemented, such as the location of the predetermined portions 704 and 706 of each of the transmission signals TX, the count values, and/or the order of detecting the data word offset in the receiver signal RX and the delay of the respective transmission signals TX. Accordingly, the data transmission alignment algorithm can be implemented in a variety of ways.

Referring back to the example of FIG. 2, upon conclusion of the data transmission alignment of the transmission signals TX, the delay controller 206 can store in the memory 216 the total amount of delay that was provided via each of the delay signals DLY to the transmit channels 106 for each of the respective transmission signals TX resulting from the data transmission alignment. Therefore, subsequent to implementation of the data transmission alignment algorithm, the memory 216 can include a total delay in clock cycles for each of the transmission signals TX in the respective registers. Accordingly, the total delay in clock cycles represents for each of the transmission signals TX represents the complete data alignment of the transmission signals TX.

In the example of FIG. 2, the delay controller 206 further includes a normalizer 226 that is configured to normalize the amount of delay of the delay element 108 of each of the transmit channels 106. For example, after providing a total amount of delay to each of the transmission signals TX to align the data of the transmission signals TX, an overlap of delay among all of the transmission signals TX becomes unnecessary. Therefore, the normalizer 226 is configured to provide a signal NRM to the transmit channels 106 to normalize the delay to a lowest delay for each of the transmission signals TX while maintaining alignment of the data of the transmission signals TX.

Figure 8:
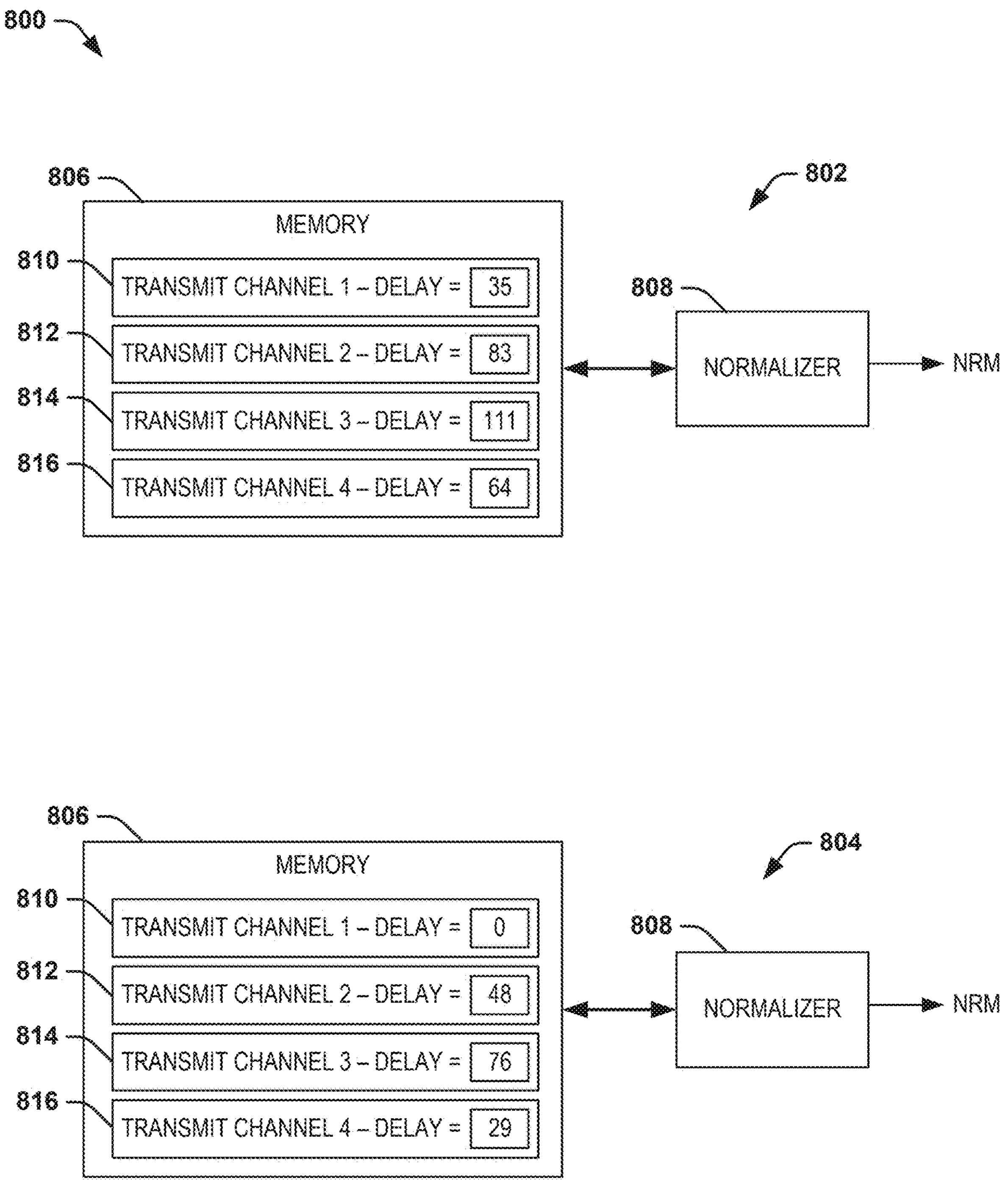
FIG. 8 illustrates an example diagram of data alignment normalization.

FIG. 8 illustrates an example diagram 800 of data alignment normalization. The diagram 800 includes a first portion 802 and a second portion 804. Each of the first and second portions includes a memory 806 and a normalizer 808 that can correspond, respectively, to the memory 216 and the normalizer 226 of the example of FIG. 2. In the example of FIG. 8, the first portion 802 corresponds to a time after alignment of the data of the transmission signals TX but before normalization of the delay, and the second portion 804 corresponds to a time after normalization of the delay.

The first portion 802 demonstrates a first register 810 corresponding to the transmit channel for the first transmission signal $TX_1$, a second register 812 corresponding to the transmit channel for the second transmission signal $TX_2$, a third register 814 corresponding to the transmit channel for the third transmission signal $TX_3$, a fourth register 816 corresponding to the transmit channel for the fourth transmission signal $TX_4$. The registers 810, 812, 814, and 816 are demonstrated as including arbitrary delay values in clock cycles, provided herein by example. In the example of FIG. 8, the first register 810 has a total clock cycle delay value of 35, the second register 812 has a total clock cycle delay value of 83, the third register 814 has a total clock cycle delay value of 111, and the fourth register 816 has a total clock cycle delay value of 64.

The normalizer 808 can be configured to access the registers 810, 812, 814, and 816 from the memory 806 and determine a lowest total delay value. It is inefficient for each of the transmit channels 106 to provide any clock cycles of delay to all of the transmission signals TX concurrently. Therefore, the normalizer 808 can subtract the lowest total delay from all of the total delay values in the registers 810, 812, 814, and 816, thereby providing zero clock cycles of delay for the latest non-delayed transmit channel. In the example of FIG. 8, the normalizer 808 determines that the first register 810 has the lowest delay, and therefore normalizes the registers 812, 814, and 816 of the other transmit channels to the total delay value of the first register 810.

The second portion 804 thus demonstrates that the normalizer has subtracted the total delay value of the first register 810, a total clock cycle delay of 35, from all of the registers 810, 812, 814, and 816. Therefore, in the second portion 804, the first register 810 has a total clock cycle delay value of 0, the second register 812 has a total clock cycle delay value of 48, the third register 814 has a total clock cycle delay value of 76, and the fourth register 816 has a total clock cycle delay value of 29. Accordingly, the total delay of each of the transmit channels is minimized while maintaining the alignment of the data of the transmission signals TX, thereby providing for more efficient operation of the data transmission system 100.

Figure 9:
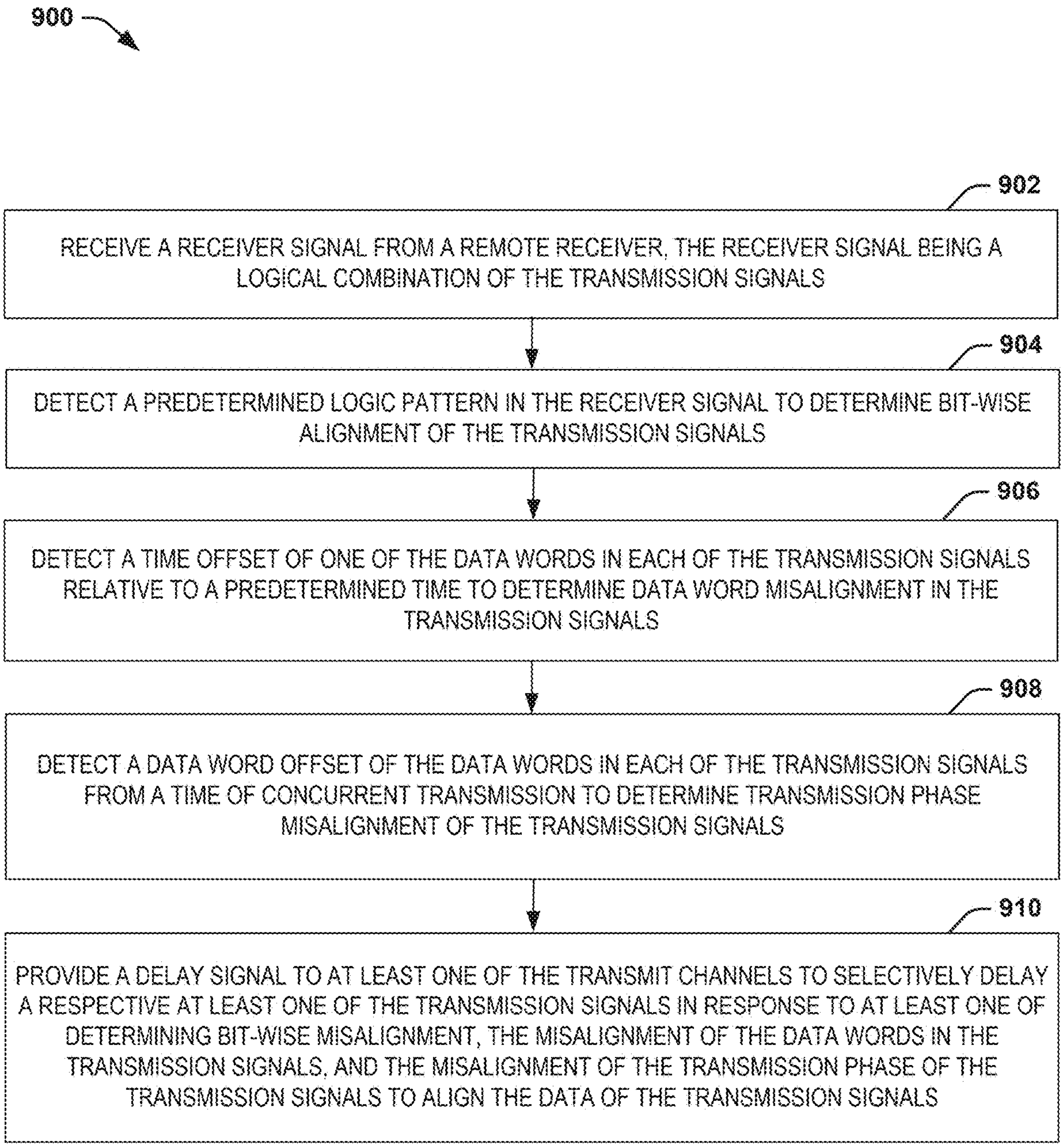
FIG. 9 illustrates an example of a method for aligning transmission data in a data transmission system.

FIG. 9 illustrates an example of a method 900 for aligning data of a plurality of transmission signals (e.g., the transmission signals TX) transmitted from a data transmitter (e.g., the data transmitter 102). Each of the transmission signals can be provided as a sequence of data words. At 902, a receiver signal (e.g., the receiver signal RX) is received from a remote receiver (e.g., the data receiver 104). The receiver signal can be a logical combination of the transmission signals. At 904, a predetermined logic pattern is detected in the receiver signal to determine bit-wise alignment of the transmission signals. At 906, a time offset (e.g., the time offset $CNT_1$) of one of the data words in each of the transmission signals relative to a predetermined time (e.g., the predetermined time 612) to determine data word misalignment in the transmission signals. At 908, a data word offset (e.g., the data word offset Δ2) of the data words in each of the transmission signals from a time of concurrent transmission is detected to determine transmission phase misalignment of the transmission signals. At 908, at least one delay signal (e.g., the delay signal(s) DLY) is provided to at least one of the transmit channels to selectively delay a respective at least one of the transmission signals in response to at least one of determining bit-wise misalignment, the misalignment of the data words in the transmission signals, and the misalignment of the transmission phase of the transmission signals to align the data of the transmission signals.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. Additionally, where the disclosure or claims recite “a,” “an,” “a first,” or “another” element, or the equivalent thereof, it should be interpreted to include one or more than one such element, neither requiring nor excluding two or more such elements. As used herein, the term “includes” means includes but not limited to, and the term “including” means including but not limited to. The term “based on” means based at least in part on.

What is claimed is:

1. A data alignment system comprising:

a bit alignment detector configured to detect bit-wise alignment of a plurality of transmission signals provided from a respective plurality of transmit channels based on a receiver signal provided by a remote receiver, the transmission signals being combined to generate the receiver signal via a data combiner in the remote receiver;

a data alignment detector configured to detect alignment of data in each of the transmission signals; and a delay controller configured to provide at least one delay signal to at least one of the transmit channels to selectively delay a respective at least one of the transmission signals in response to at least one of the bit alignment detector failing to detect the bit-wise alignment of the transmission signals and the data alignment detector failing to detect alignment of the data in each of the transmission signals, the delay controller comprising a normalizer configured to determine a total amount of selective delay of each of the transmission signals and to provide a normalization signal to at least one of the transmit channels to reduce the total amount of selective delay of each of the transmission signals by a least total amount of selective delay of the transmission signals.

2. The system of claim 1, wherein each of the transmission signals has a predetermined logic pattern, wherein the bit alignment detector is configured to detect the predetermined logic pattern in the receiver signal to detect the bit-wise alignment of the transmission signals.

3. The system of claim 2, wherein the predetermined logic pattern is an alternating sequence of one of a logic-0 and a logic-1 at each of clock cycles of a clock signal, wherein the data combiner comprises a logic-OR gate configured to provide a logic-OR operation on the transmission signals to provide the receiver signal, such that the bit alignment detector is configured to detect the bit-wise alignment of the transmission signals based on the receiver signal having the alternating sequence of one of the logic-0 and the logic-1 at each of the clock cycles.

4. The system of claim 1, wherein each of the transmission signals comprise data words, wherein the data alignment detector comprises a data word alignment detector configured to detect a time offset of one of the data words in each of the transmission signals relative to a predetermined time, and to provide an indication of the time offset to the delay controller, the delay signal being provided to the at least one of the transmit channels to selectively delay the respective at least one of the transmission signals based on the respective indication of time offset of the respective at least one of the transmission signals.

5. The system of claim 4, wherein the delay controller is configured to provide a trigger signal to the transmit channels to insert a predetermined code in a predetermined portion of a data word in each of the transmission signals, wherein the data word alignment detector is configured to detect the predetermined code in the receiver signal and to determine the time offset based on a difference in clock cycles of a clock signal of the predetermined code relative to a predetermined number of the clock cycles.

6. The system of claim 1, wherein each of the transmission signals comprise data words, wherein the data alignment detector comprises a data transmission alignment detector configured to detect a data word offset of the data words in each of the transmission signals from a time of concurrent transmission, and to provide an indication of the data word offset to the delay controller, the delay signal being provided to the at least one of the transmit channels to selectively delay the respective at least one of the transmission signals by at least one data word based on the respective indication of the data word offset of the respective at least one of the transmission signals.

7. The system of claim 6, wherein the delay controller is configured to provide a trigger signal to insert a sequential count value in a sequence of the data words in a plurality of the transmission signals, wherein the data transmission alignment detector is configured to determine the data word offset based on determining a difference in the sequential count value between the plurality of the transmission signals in the receiver signal.

8. The system of claim 7, wherein the delay controller is configured to provide the trigger signal to insert the sequential count value in a first location and a null value in a second location of each data word in the sequence of the data words in a first transmission signal, and to insert the sequential count value in the second location and the null value in the first location of each data word in the sequence of the data words in a second transmission signal, wherein the data transmission alignment detector is configured to determine the data word offset between the first and second transmission signals based on determining a difference in the sequential count value between the first and second locations in the receiver signal.

9. The system of claim 8, wherein the delay controller is configured to provide the trigger signal to insert the null value in each of the first and second locations of each of a remaining at least one of the transmission signals other than the first and second transmission signals.

10. A method for aligning data of a plurality of transmission signals transmitted by a data transmitter, each of the transmission signals being provided as data words, the method comprising:

receiving a receiver signal from a remote receiver, the receiver signal being a logical combination of the transmission signals;

detecting a predetermined logic pattern in the receiver signal to determine bit-wise alignment of the transmission signals;

detecting a time offset of one of the data words in each of the transmission signals relative to a predetermined time to determine data word misalignment in the transmission signals;

detecting a data word offset of the data words in each of the transmission signals from a time of concurrent transmission to determine transmission phase misalignment of the transmission signals; and providing a delay signal to at least one of the transmit channels to selectively delay a respective at least one of the transmission signals in response to at least one of determining bit-wise misalignment, the misalignment of the data words in the transmission signals, and the misalignment of the transmission phase of the transmission signals to align the data of the transmission signals.

11. The method of claim 10, wherein detecting the time offset comprises determining the data word misalignment in the transmission signals in response to selectively delaying the at least one of the transmission signals to provide the bit-wise alignment, wherein detecting the data word offset comprises determining misalignment of the transmission phase of the transmission signals in response to selectively delaying the at least one of the transmission signals based on the data word misalignment.

12. The method of claim 10, wherein detecting the time offset comprises:

providing a trigger signal to the transmit channels to insert a predetermined code in a predetermined portion of one of the data words in each of the transmission signals;

detecting the predetermined code in the receiver signal; and determining a difference in clock cycles of the predetermined code relative to a predetermined number of the clock cycles.

13. The method of claim 10, wherein detecting the data word offset comprises:

providing a trigger signal to insert a sequential count value in a first location and a null value in a second location of each data word in a sequence of the data words in a first transmission signal, and to insert the sequential count value in the second location and the null value in the first location of each data word in the sequence of the data words in a second transmission signal;

inserting the null value in each of the first and second locations of each of a remaining at least one of the transmission signals other than the first and second transmission signals; and determining a difference in the sequential count value between the first and second locations in the receiver signal.

14. The method of claim 10, further comprising:

determining a relative phase of each of the data words in each of the transmission signals after the selective delay of the at least one of the transmission signals to align the data of the transmission signals; and providing a normalization signal to at least one of the transmit channels to reduce a transmission delay of each of the transmission signals by a least amount of selective delay of the transmission signals.

15. A data transmission system comprising:

a data receiver comprising a data combiner configured to receive a plurality of transmission signals and to combine the transmission signals to generate a receiver signal, each of the transmission signals being provided as data words having a predetermined logic pattern; and a data transmitter comprising:

a plurality of transmit channels configured to transmit the respective transmission signals, each of the transmit channels comprising a delay element; and a data alignment system configured to receive the receiver signal, the data alignment system comprising:

a bit alignment detector configured to detect bit-wise alignment of the transmission signals based on detecting the predetermined logic pattern in the receiver signal;

a data word alignment detector configured to detect a time offset of one of the data words in each of the transmission signals relative to a predetermined time;

a data transmission alignment detector configured to detect a data word offset of the data words in each of the transmission signals from a time of concurrent transmission; and a delay controller configured to provide at least one delay signal to a respective at least one of the transmit channels to align the data in each of the transmission signals in response to at least one of the bit alignment detector failing to detect the bit-wise alignment of the transmission signals, the data word alignment detector detecting the time offset, and the data transmission alignment detector detecting the data word offset.

16. The system of claim 15, wherein the predetermined logic pattern is an alternating sequence of a logic-0 and a logic-1 at each of clock cycles of a clock signal, wherein the data combiner comprises a logic-OR gate configured to provide a logic-OR operation on the transmission signals to provide the receiver signal, such that the bit alignment detector is configured to detect the bit-wise alignment of the transmission signals based on the receiver signal having the alternating sequence of one of the logic-0 and the logic-1 at each of the clock cycles.

17. The system of claim 15, wherein the delay controller is configured to provide a trigger signal to the transmit channels to insert a predetermined code in a predetermined portion of a data word in each of the transmission signals, wherein the data word alignment detector is configured to detect the predetermined code in the receiver signal and to determine the time offset based on a difference in clock cycles of the predetermined code relative to a predetermined number of clock cycles.

18. The system of claim 15, wherein the delay controller is configured to provide a trigger signal to insert a sequential count value in a first location and a null value in a second location of each data word in a sequence of the data words in a first transmission signal, to insert the sequential count value in the second location and the null value in the first location of each data word in the sequence of the data words in a second transmission signal, and to insert the null value in each of the first and second locations of each of a remaining at least one of the transmission signals other than the first and second transmission signals, wherein the data transmission alignment detector is configured to determine the data word offset between the first and second transmission signals based on determining a difference in the sequential count value between the first and second locations in the receiver signal.

19. The system of claim 15, wherein the data receiver is located in a cryogenic environment and the data transmitter is located in a non-cryogenic environment.

* * * * *